United States Patent [19]
Walker

[11] 3,725,362
[45] Apr. 3, 1973

[54] POLY(ARYLENE SULFIDE) COMPOSITION AND METHOD FOR DECREASING THE MELT FLOW OF POLY(ARYLENE SULFIDE)

[75] Inventor: John H. Walker, Bartlesville, Okla.

[73] Assignee: Phillips Petroleum Company, Bartlesville, Okla.

[22] Filed: Mar. 8, 1971

[21] Appl. No.: 122,254

[52] U.S. Cl.................260/79, 260/37 R, 260/79.1, 264/211
[51] Int. Cl. ............................................C08g 23/00
[58] Field of Search.............................260/79, 79.1

[56] References Cited

UNITED STATES PATENTS 3,458,486  7/1969  Ray et al. ........................260/79.1
3,487,052  12/1969  Millen et al. ...........................260/79

OTHER PUBLICATIONS

Gaylord, Polyethers, Part III, "Polyalkylene Sulfides and Other Polyethers," 1962, Pg. 164 & 165, Interscience Publ. N.Y.

Primary Examiner—M. J. Welsh
Assistant Examiner—Melvyn I. Marquis
Attorney—Young & Quigg

[57] ABSTRACT

The melt flow of poly(arylene sulfides) is decreased by heating the polymer in the presence of a melt flow modifier comprising sulfur and a melt flow modifier rate accelerator such as zinc oxide at a temperature above the melt point of the resin. The poly(arylene sulfide) materials of decreased melt flow retain their thermoplastic character and are readily formed into useful shaped objects as by injection molding.

16 Claims, No Drawings

POLY(ARYLENE SULFIDE) COMPOSITION AND METHOD FOR DECREASING THE MELT FLOW OF POLY(ARYLENE SULFIDE)

This invention relates to the treatment of aromatic polymers. More particularly, the invention relates to compositions of matter comprising a polymer of an arylene sulfide containing a melt flow reducing amount of sulfur in combination with a melt flow reducing rate accelerator such as zinc oxide sufficient to effect a reduction in the melt flow of the polymer under the influence of heat.

Aromatic sulfide polymers ranging in consistency from viscous liquids to crystalline solids are known. While polymers of this type exhibit desirable properties for many applications such as molding compositions, the unmodified polymers, e.g., obtained directly from the reactors, normally possess a high melt flow which limits their use in certain instances. Such polymers, i.e., the unmodified materials, possess a very low melt viscosity which makes it difficult to handle them by conventional injection molding, extrusion, etc., practices.

Unexpectedly, I have discovered that a certain class of additives can be employed for decreasing the melt flow of sulfur-containing polymers without causing any appreciable loss in desirable properties. The resulting polymer thus obtained is a stable resinous material which remains sufficiently thermoplastic to further pressure mold and shape, press into sheet or draw or extrude into fibers. The sulfur-containing polymeric materials which are modified according to the invention do not degrade materially at normal processing temperatures and can be readily formed into useful articles such as sheets.

In accordance with the practice of this invention, there is provided a method for decreasing the melt flow of a poly(arylene sulfide) polymer by admixing the polymer with a melt flow modifier system comprising sulfur in admixture with certain hereinafter-described modifier rate accelerators and subjecting the admixture to an elevated temperature above the softening or melt point of the polymer for a time sufficient to effect a substantial decrease in melt flow of the polymer molecules.

The poly(arylene sulfides) which are improved by the processes of this invention include the homopolymers, copolymers, terpolymers, and the like prepared by the reaction of polyhalo-substituted aromatic compounds with alkali metal sulfides. The preparation of such polymeric compounds can be effected by the processes disclosed in Edmonds et al. U. S. Pat. No. 3,354,129. Generally, the poly(arylene sulfide) compounds comprise the reaction product formed by contacting at least one polyhalo-substituted cyclic compound containing unsaturation between adjacent ring atoms and wherein the halogen atoms are attached to ring carbon atoms with an alkali metal sulfide and a polar organic solvent at an elevated temperature. Generally, the polar organic compound will substantially dissolve both the alkali metal sulfide and the polyhalo-substituted aromatic compound. Preferably, the polyhalo-substituted cyclic compounds are selected from the group consisting of:

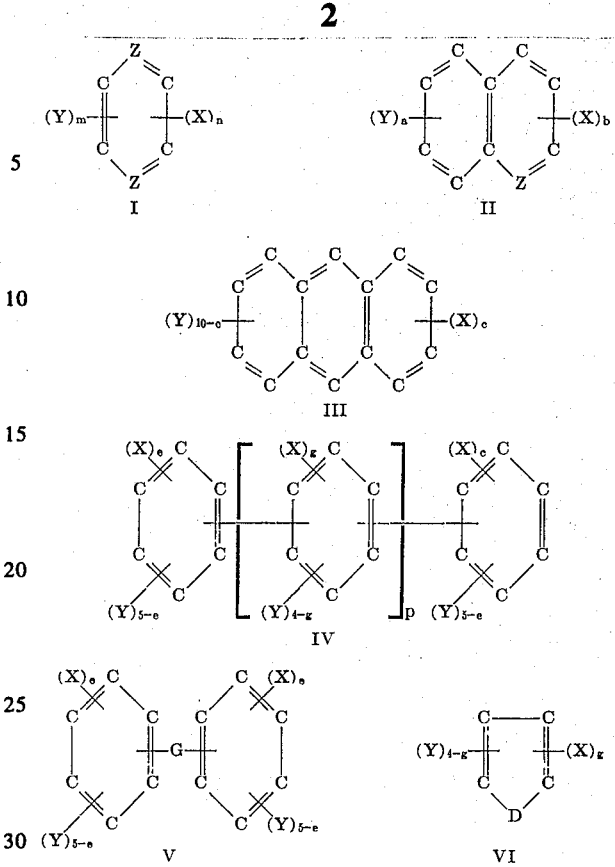

wherein each X is a halogen selected from the group consisting of chlorine, bromine, iodine and fluorine, preferably chlorine and bromine, each Y is selected from the group consisting of hydrogen.

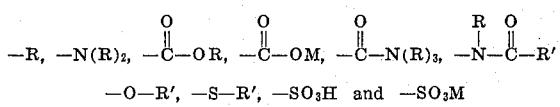

wherein each —is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S— and

G is selected from the group consisting of

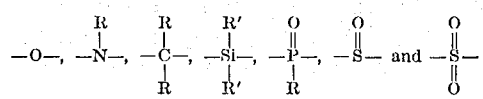

M is an alkali metal selected from the group consisting of sodium, potassium, lithium, rubidium, and cesium; $n$ is a whole integer of from 2 to 6, inclusive; when both Z's in Formula I are —C=, $m = 6-n$, when one Z Formula I is —C=, $m = 5-n$, when both Z's in Formula I are —N=, $m = 4-n$; $b$ is a whole integer from 2 to 8, inclusive, and Z in Formula II is —C=, a = 8−b, when Z in Formula II is —N=, a = 7−b; c is a whole integer of from 2 to 10, inclusive; e is a whole integer of from 1 to 5, inclusive; g is a whole integer of from 2 to 4, inclusive; and p is a whole integer selected from the group consisting of 0 and 1.

The compounds of the above general formulas which are preferred are those which contain not more than three halogen atoms, and more preferably are dihalo-substituted compounds, especially dihalobenzenes and dihalobiphenyls.

Some specific examples of polyhalo-substituted aromatic compounds and polyhalo-substituted heterocyclic compounds of the above general formulas which are reacted with alkali metal sulfides to produce the polymeric products which are improved according to the process of this invention are:

1,2-dichlorobenzene
1,3-dichlorobenzene
1,4-dichlorobenzene
2,5-dichlorotoluene
1,4dibromobenzene
1,4-diiodobenzene
1,4-difluorobenzene
2,5-dibromoaniline
N,N-dimethyl-2,5-dibromoaniline
1,3,5-trichlorobenzene
1,2,4,5-tetrabromobenzene
hexachlorobenzene
1-n-butyl-2,5-dichlorobenzene
1-cyclohexyl-2,5-diiodobenzene
1-isooctyl-2,4-difluorobenzene
1-n-dodecyl-2,5-dichlorobenzene
1-benzyl-2,5-dibromobenzene
1,4-di-n-butyl-2,5-dichlorobenzene
1,4-di-n-nonyl-2,6-dibromobenzene
1,3,5-trichloro-2,4,6-triphenylbenzene
1,4-dibromo-2,3,5,6-tetra(4-ethylphenyl)benzene
methyl 2,5-dichlorobenzoate
isopropyl 2,3,5-tribromobenzoate
cyclohexyl 2,4,6-triiodobenzoate
phenyl 2,3,4,5,6-pentachlorobenzoate
2,5,-dichlorobenzamide
N,N-di-N-dodecyl-2,4,5-tribromobenzamide
ethyl 2,4,5-trichloroacetanilide
cyclohexyl N-methyl-2,5-dibromoacetanilide
1,4-dibromonaphthalene
1,4-dichloro-7,8-diethylnaphthalene
1-methoxy-2,5-dichlorobenzene
1-cyclohexylthio-2,5-dichlorobenzene
1,4,7,8-tetrabromo-2,3,5,6-tetra-n-butylnaphthalene
1,3,5-trichloro-7-aminonaphthalene
n-octyl 2,4-dibromonaphthalene-1-carboxylate
N,N-dimethyl-5,6,7,8-tetrabromo-1-naphthalenecarboxamide
1-acetamido-2,4-dibromonaphthalene
8-decoxyl-1,4-difluoronaphthalene
6,7-dibenzyl-8-methylthio-1,4-dichloronaphthalene
1,4-dichloroanthracene
1,7-dibromo-6-cyclohexylanthracene
2,8-diiodo-3,7-diethylanthracene
1-dodecyl-2,6-difluoroanthracene
1,2,4-trichloro-6-carbethoxyanthracene
2,6-dibromo-8-aminoanthracene
3,7-diiodo-4-cyclohexylthioanthracene
n-decyl 3,8-difluoroanthracene carboxylate
1-acetamido-2,4-dibromoanthracene
10-dodecoxy-1,3,5-trichloroanthracene
4,4'-dichlorobiphenyl
3,4'-dibromo-2-aminobiphenyl
2,2',4-tribromo-6-acetamidobiphenyl
3,3'-dichloro-4,4'-didodecylbiphenyl
4,4'-diiodo-3-ethoxy-6-n-octylbiphenyl
2,2',4,4'-tetrabromo-6-N,N-dimethylaminobiphenyl
4,4'-dichloro-3,3'-dicyclohexylbiphenyl
4,4''-dibromo-p-terphenyl
3,3',3''-trichloro-p-terphenyl
4,4''-dichloro-3'-acetamido-p-terphenyl
4,4''-difluoro-2,2',2''-tri-n-decyl-3'-methoxy-p-terphenyl
4,4''-dibromo-3'-carbbutoxy-p-terphenyl
4,4''-dichloro-2-(N-acetylamino)-p-terphenyl
3,4-dibromothiophene
3,4-dichlorofuran
3,4-difluoropyrrole
2,5-dibromo-4-aminothiophene
2,5-dichloro-3-ethoxythiophene
3,4-difluoro-5-acetamidofuran
3,4-dibromo-5-carbethoxypyrrole
2,5-dichloropyridine
3,5-dibromo-4-methylpyridine
4,8-diiodoquinoline
2,3,6,7-tetrachloro-4,5-di-n-butylquinoline
1,4-dibromo-2,3,5,6-tetrafluorobenzene
4-chlorobromobenzene
2,5-dichlorobenzene-sulfonic acid
sodium 2,5-dibromobenzenesulfonate
2,8-difluoronaphthalenecarboxylic acid
lithium 2,7-diiodoanthracenecarboxylate
p,p'-dichlorodiphenyl ether
o,p'-dibromodiphenylamine
2,4'-difluorodiphenylmethane
3,3'-dichlorodiphenyl dimethylsilane
di(2-methyl-4-bromophenyl) sulfoxide
methyl di(3-ethyl-4-chlorophenyl) phosphite
4-bromophenyl 3-n-butyl-4-chlorophenyl sulfone
2,6-dichloropyrazine It is to be understood that the polymeric reactants according to the invention are intended to include homopolymers obtained by the reaction of one of the above-described compounds with an alkali metal sulfide as well as copolymers and/or terpolymers, etc., obtained when mixtures of two or more of the above compounds are reacted with an alkali metal sulfide.

The alkali metal sulfides which are reacted with the above-described compounds to form a reactant of the process are represented by the formula $M_2S$ (M as described above), and includes monosulfides of sodium, potassium, lithium, rubidium, and cesium, including the anhydrous and hydrated forms of these sulfides. These alkali metal sulfides can be charged per se, or they can be formed in situ by reaction of an alkali metal hydroxide with $H_2S$ at a mol ratio of alkali metal hydroxide/$H_2S$ of about 2/1.

Polar compounds which are employed in the reaction to make the polymeric reactants of the invention should be a solvent for the polyhalo-substituted aromatic compounds or polyhalo-substituted heterocyclic compounds and the metal sulfide. Examples of suitable solvents include amides, lactams, sulfones and the like. Specific examples of such compounds are N-methylpyrrolidone, pyrrolidone, caprolactam, N-ethylcaprolactam, sulfolane, dimethylacetamide, hexamethylphosphoramide, tetramethylurea, N,N'-ethylene dipyrrolidone, and dimethylformamide.

The additive systems which are utilized by the processes of this invention include sulfur in combination with a flow rate modifier accelerator. It will be appreciated that the chemicals normally used in combination with sulfur for the curing of elastomers such as natural rubber, SBR rubber and the like can be used to provide some improvement in reducing the melt flow of poly(arylene sulfide) resins. It has been found that chemicals selected from the group consisting of zinc oxide, ferric oxide, N-oxydiethylene benzothiazole-2-sulfenamide, benzothiazyl disulfide, 2-mercaptobenzothiazole, and mixtures thereof are particularly useful when combined with sulfur according to the practice of this invention. Of these preferred materials, zinc oxide and ferric oxide have been found to provide the most beneficial results, with zinc oxide being presently particularly preferred. In forming the melt flow reducer systems of this invention, the sulfur, in an amount of 1.5 to about three parts per hundred parts of poly(arylene sulfide), is combined with from two to about five parts by weight of flow rate modifier accelerator per hundred parts by weight of poly(arylene sulfide) resins. The final melt flow reducer systems will have a sulfur:flow rate modifier accelerator ratio of 1:1.3–3.3.

It is a critical feature of this invention that the additive systems contain sulfur and flow rate modifier accelerator within the range listed. When using the flow rate reducer systems of this invention, accelerated decrease in the melt flow of the poly(arylene sulfide) polymeric material is accomplished with substantially no deteriorative effects and at a rapid rate, e.g., in 10 minutes or less. The treatment of the poly(arylene sulfide) polymeric material is carried out by first forming a homogeneous dispersion of at least one of the above-defined polymeric products and the flow rate reducer agents of the invention. The formation of the dispersion can be carried out in any suitable manner, including dry mixing, grinding the ingredients together, or mixing in the presence of a dispersing medium.

The sulfur and flow rate modifier accelerator can be mixed prior to admixture with the polymer, added simultaneously without prior mixing or added sequentially, the order of such sequential mixing not being critical.

When employing a liquid dispersing medium, the slurry of polymer and flow rate reducer system is agitated to form a homogeneous mixture. Formation of the mixture and subsequent separation of the dispersing agent is normally carried out at temperatures lower than the melting point of sulfur. Following formation of the mixture, the dispersing medium can be separated by such methods as filtration, decantation, evaporation and the like. Solid dispersants such as finely divided talc, silica and the like can also be used. The dispersants will remain in the formulations as fillers.

In the processes of this invention, the mixture of poly(arylene sulfide) and melt flow decreasing system is heated to a temperature which is at least above the melting point of the chosen polymeric product. The melt point of arylene sulfide polymers can be readily determined by differential thermal analysis (DTA) by heating a 10 mg sample of the polymer at a rate of 10° C. per minute. The melt point is taken from the DTA thermogram in a conventional manner. Preferably, the heating temperature will be in the range of from about 25° F. to about 350° F. above the melt point of the polymer, with a range of about 50° F. to about 275° F. being particularly preferred. This temperature generally will be in the range of about 200° F. to about 850° F., and preferably the range will be from about 575° F. to about 750° F. The time during which the mixture is held at such a temperature will range from about 0.5 to about 15 minutes, and preferably it will be in the range of about 1 to about 10 minutes. The processes of this invention are particularly applicable in applications involving the forming of molded products, such as by extrusion or compression molding.

The improved polymeric compositions of this invention can be molded into a variety of useful articles by molding techniques which are well known in the art. Molding should be carried out above the melting point or the softening point, but below the decomposition point of the particular polymer being molded. Suitable molding techniques include injection molding, compression molding, vacuum forming, extrusion and the like. Very high molecular weight polymers can be fabricated by means of a binder or by a sintering technique using powder molding is used in powder metallurgy.

In addition to the melt flow decreasing system, other ingredients normally employed can also be incorporated including extenders, fillers, pigments, plasticizers, stabilizers, etc. Among the fillers which can be employed are, for instance, carbon blacks, calcium carbonate, finely divided silica, calcium silicate, alumina, etc. Good results are obtained as far as heat resistance and physical properties are concerned even in the absence of a filler.

The following examples are intended to illustrate the compositions and processes of this invention.

EXAMPLE I

Poly(phenylene sulfide) was prepared by reacting sodium sulfide with p-dichlorobenzene in N-methylpyrrolidone according to the method of Edmonds et al. U. S. Pat. No. 3,354,129. The raw polymer had an intrinsic viscosity of 0.15 cps, and a melting point in the range of 540°–550° F.

A homogeneous mixture of 100 parts by weight of the above-described polymer and three parts by weight of sulfur was prepared by blending the ingredients for 3 minutes in a Henschel mixer. The thus-prepared homogeneous mixture was then extruded at a temperature of 600° F., with the extruder being operated at a speed such that the residence time of the mixture in the extruder was 5 minutes. The first extrusion of the mixture at these conditions resulted in no apparent substantial decrease in the melt flow of the poly(phenylene sulfide) as evidenced by the appearance of the extrudate. No significant decrease in melt flow of the extrudate was observed for a second and third pass of the mixture through the extruder.

This example demonstrates that the use of sulfur alone is ineffective in accelerating a decrease in melt flow of poly(arylene sulfides) under the conditions employed in this test.

EXAMPLE II

Homogeneous mixtures were prepared of zinc oxide, lead oxide, and magnesium oxide, respectively, and poly(phenylene sulfide) from the same batch which provided the polymeric material of Example I. In each mixture, 90 parts by weight of polymer was blended with 10 parts by weight of metal oxide. The homogeneous mixtures were heated at 700° F. for 20 minutes and manually stirred with no observable effect on melt viscosity during this period of time.

This example demonstrates that the use of flow rate modifier accelerators in the absence of sulfur is ineffective in accelerating a decrease in melt flow rate of poly(arylene sulfides) under the condition employed.

EXAMPLE III

A homogeneous mixture of 100 parts by weight of poly(phenylene sulfide) from the same batch which provided the polymeric material for Example I was compounded with five parts by weight of sulfur and five parts by weight of zinc oxide using a Henschel mixer as in Example I. The thus-prepared homogeneous mixture was then extruded at a temperature of 600° F. with the extruder being operated at a speed such that the residence time of the mixture in the extruder was 5 minutes. The poly(phenylene sulfide)-sulfur-zinc oxide mixture exhibited decreased melt flow on the first pass as evidenced by the more viscous appearance of the extrudate.

EXAMPLE IV

A homogeneous mixture of 100 parts by weight of poly(phenylene sulfide) taken from the same batch which provided the polymeric material for Example I, three parts by weight sulfur, 1.5 parts by weight of stearic acid, one part by weight 2-mercaptobenzothiazole (Captax), 0.5 part by weight benzothiazyl disulfide (Altax), and five parts by weight zinc oxide was prepared using a Henschel mixer. The thus-prepared homogeneous mixture was then extruded at a temperature of 600° F. with the extruder being operated at a speed such that the residence of the mixture in the extruder was 5 minutes. The sulfur, stearic acid, Captax, Altax, and zinc oxide mixture showed strong evidence of a melt flow decrease on the first pass through the extruder as manifested by a significant increase in melt viscosity of the extrudate.

Examples III and IV demonstrate the melt flow reducer systems of the invention containing sulfur and at least one flow rate modifier accelerator are effective in decreasing the melt flow of poly(arylene sulfides).

EXAMPLE V

A series of runs was carried out in which poly(phenylene sulfide) (taken from the same batch which provided the polymeric material for Example I) was compounded with various additives to determine the effect of such additives upon the time required to effect an increase in the molecular weight of the polymer. In each run, 100 parts by weight of the poly(phenylene sulfide) was admixed with the indicated additive system by blending in a Henschel mixer until a homogeneous mixture was obtained. The thus homogeneous mixture of the polymer curing system was then extruded at temperatures in the range of about 700°–800° F., with the extruder being operated at a speed such that the residence time of the mixture at the indicated temperature range from about 2 to about 10 minutes.

| Run | Melt Flow Reducer System |
|---|---|
| A | 5 parts by weight zinc oxide, 1.5 parts by weight sulfur |
| B | 5 parts by weight zinc oxide, 3 parts by weight sulfur |
| C | 2 parts by weight zinc oxide, 1.5 parts by weight sulfur |
| D | 2 parts by weight zinc oxide, 3 parts by weight sulfur |
| E | 5 parts by weight zinc oxide |

A decrease in melt flow as manifested by a noticeable increase in melt viscosity of the extrudate was noticed with the zinc oxide-sulfur melt flow reducer systems regardless of the level of zinc oxide and sulfur. The zinc oxide by itself showed no observable effect upon the melt viscosity of the extrudate.

EXAMPLE VI

A series of runs was effected in which samples of poly(phenylene sulfide) taken from the same batch which provided the polymeric material for Example I were heat treated according to the practice of the invention and the physical properties of such treated samples were determined. The results are reported in the following table. For purposes of comparison, the physical properties of a sample of poly(phenylene sulfide) from the same source batch which was subjected to heat treatment in the absence of the additive systems of this invention at a temperature below the melt point of the resin are included in the table.

TABLE

| Run Number | 1 Extruder Cured at 700–800° F. | 2 Extruder Cured at 700–800° F. | 3 Extruder Cured at 700–800° F. | 5 Low Temp. Cured at 500° F. |
|---|---|---|---|---|
| PPS, Parts | 100 | 100 | 100 | 100 |
| Zinc Oxide, PHR | 5 | 5 | 2 | 0 |
| Sulfur, PHR | 1.5 | 3 | 1.5 | 0 |
| Melt Flow$^a$ | 0.9 | 2.5 | 9.3 | 20.2 |
| Flexural Modulus, psi | 540,000 | 423,000 | 444,000 | 555,000 |
| Flexural Strength, psi | - | 13,590 | 14,700 | 14,360 |
| Tensile, psi | 10,500 | 8,550 | 8,650 | 8,850 |
| Elongation, % | 7 | 4 | 4 | 2 |
| Izod Impact, unnotched | 2.5 | 5.9 | 4.0 | 2.3 |
| Izod Impact, notched | - | 0.5 | 0.5 | 0.4 |

$^a$melt flow determined by ASTM D1238-62T modified procedure at 620° F. using 5 kg weight, value expressed as g/10 min.

The foregoing table demonstrates that the physical properties of sulfur-zinc oxide treated poly(phenylene sulfide) are comparable to the heat treated poly(phenylene sulfide), i.e., poly(phenylene sulfide) heated below the melt point of the polymer in the presence of air.

While certain embodiments of the invention have been described for illustrative purposes, the invention is not limited thereto. Various other modifications or embodiments of the invention will be apparent to those skilled in the art in the view of this disclosure. Such modifications or embodiments are within the spirit and scope of the disclosure.

I claim:

1. A processable thermoplastic polymeric composition of matter comprising poly(arylene sulfide), sulfur and a melt flow modifier rate accelerator selected from the group consisting of zinc oxide, ferric oxide, N-oxydiethylene benzothiazole-2-sulfenamide, benzothiazyl disulfide, 2-mercaptobenzothiazole and mixtures thereof, said sulfur and rate accelerator being present in an amount sufficient to effect a reduction in the melt flow of said poly(arylene sulfide) in comparison to poly(arylene sulfide) containing no sulfur and no melt flow modifier rate accelerator, the amount of said sulfur being in the range of 1.5 to about three parts by weight per 100 parts by weight of poly(arylene sulfide), the amount of said rate accelerator being in the range of two to about five parts by weight per 100 parts by weight of poly(arylene sulfide), the weight ratio of sulfur to rate accelerator being in the range of 1:1.3 to 1:3.3.

2. A composition according to claim 1 wherein said rate accelerator is zinc oxide.

3. A composition of matter according to claim 1 wherein said poly(arylene sulfide) comprises the reaction product formed by contacting at least one polyhalo-substituted cyclic compound containing unsaturation between adjacent ring atoms and wherein the halogen atoms are attached to ring carbon atoms with an alkali metal sulfide in a polar organic solvent at an elevated temperature.

4. A composition of matter according to claim 3 wherein said polyhalo-substituted cyclic compound is selected from the group consisting of:

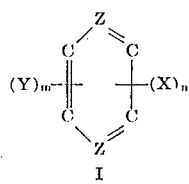 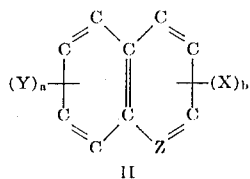

I                                II

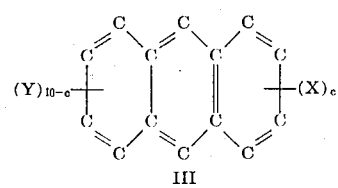

III

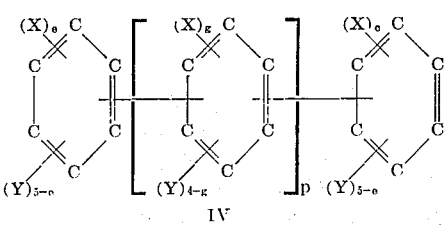

IV

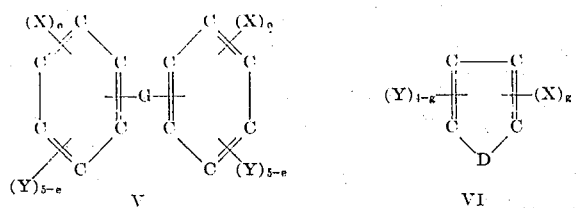

V                                VI wherein each X is a halogen selected from the group consisting of chlorine, bromine, iodine and fluorine, preferably chlorine and bromine, each Y is selected from the group consisting of hydrogen,

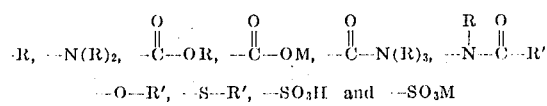

wherein each -R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S— and

G is selected from the group consisting of

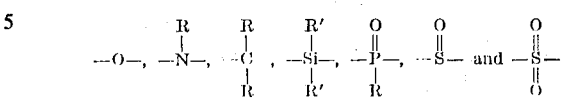

M is an alkali metal selected from the group consisting of sodium, potassium, lithium, rubidium, and cesium; $n$ is a whole integer of from 2 to 6, inclusive; when both Z's in Formula I are —C=, $m = 6-n$, when one Z in Formula I is —C=, $m = 5-n$, when both Z's in Formula I are —N=, $m = 4-n$; $b$ is a whole integer from 2 to 8, inclusive, and Z in Formula II is —C=, $a = 8-b$, when Z in Formula II is —N=, $a = 7-b$, $c$ is a whole integer of from 2 to 10, inclusive; $e$ is a whole integer of from 1 to 5, inclusive; $g$ is a whole integer of from 2 to 4, inclusive, and $p$ is a whole integer selected from the group consisting of 0 and 1; and wherein said polar compound is a compound that will substantially dissolve both the alkali metal sulfide and the polyhalo-substituted compound having a formula as defined.

5. A composition of matter according to claim 4 wherein said rate accelerator is zinc oxide.

6. A composition of matter according to claim 4 wherein said cyclic compound is p-dichlorobenzene, said alkali metal sulfide is sodium sulfide, and said rate accelerator is a mixture of 2-mercaptobenzothiazole and benzothiazyldisulfide.

7. A composition of matter according to claim 5 wherein said cyclic compound is p-dichlorobenzene, and said alkali metal sulfide is sodium sulfide.

8. A process for the production of processable thermoplastic poly(arylene sulfide) polymers which comprises heating at an elevated temperature a mixture consisting essentially of:
   a. poly(arylene sulfide) polymer, and
   b. an effective amount of an admixture consisting essentially of sulfur and a melt flow modifier rate accelerator;
   wherein said rate accelerator is selected from the group consisting of zinc oxide, ferric oxide, N-oxydiethylene benzothiazole-2-sulfenamide, benzothiazyl disulfide, 2-mercaptobenzothiazole, and mixtures thereof;
   wherein the amount of said sulfur is in the range of 1.5 to about three parts by weight per 100 parts by weight of poly(arylene sulfide), the amount of said rate accelerator is in the range of two to about five parts by weight of poly(arylene sulfide), and the weight ratio of sulfur to rate flow accelerator is in the range of 1:1.3 to 1:3.3; and
   wherein said heating is effected at a temperature in the range of about 25° F. to about 350° F. above the melt point of said poly(arylene sulfide);
   whereby there is obtained a processable thermoplastic poly(arylene sulfide) polymer composition characterized by a significantly reduced melt flow in comparison to poly(arylene sulfide) polymer containing no sulfur and rate accelerator.

9. A process according to claim 8 wherein said mixture is heated at a temperature above the melt point of said poly(arylene sulfide) for from 0.5 to 15 minutes.

10. A process according to claim 9 wherein said rate accelerator is zinc oxide.

11. A process according to claim 9 wherein said poly(arylene sulfide) comprises the reaction product formed by contacting at least one polyhalo-substituted cyclic compound containing unsaturation between adjacent ring atoms and wherein the halogen atoms are attached to ring carbon atoms with an alkali metal sulfide in a polar organic solvent at an elevated temperature.

12. A process according to claim 11 wherein said polyhalo-substituted cyclic compound is selected from the group consisting of:

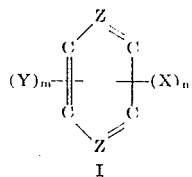
I

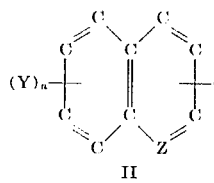
II

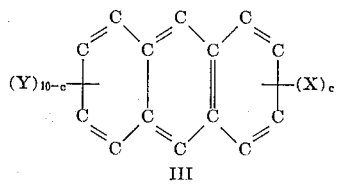
III

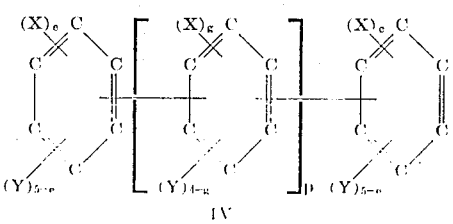
IV

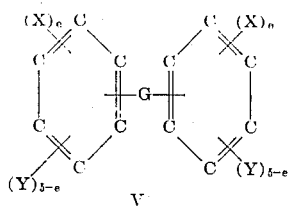
V

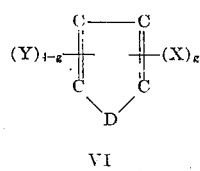
VI wherein each X is a halogen selected from the group consisting of chlorine, bromine, iodine and fluorine, preferably chlorine and bromine, each Y is selected from the group consisting of hydrogen,

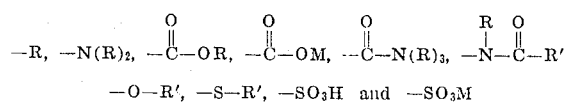

wherein each —R is selected from the group consisting of hydrogen and alkyl, cycloalkyl, aryl, aralkyl, and alkaryl radicals containing from 1 to 12 carbon atoms, inclusive; each R' is selected from the group consisting of alkyl, cycloalkyl, aryl, aralkyl and alkaryl radicals containing from 1 to 12 carbon atoms, inclusive; each Z is selected from the group consisting of —N= and —C=; D is selected from the group consisting of —O—, —S— and

G is selected from the group consisting of

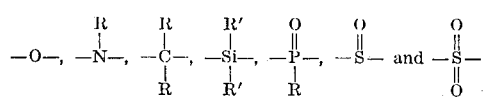

M is an alkali metal selected from the group consisting of sodium, potassium, lithium, rubidium, and cesium; n is a whole integer of from 2 to 6, inclusive; when both Z's in Formula I are —C=, $m = 6-n$, when one Z in Formula I is —C=, $m = 5-n$, when both Z's in Formula I are —N=, $m = 4-n$; b is a whole integer from 2 to 8, inclusive, and Z in Formula II is —C=$a = 8-b$, when Z in Formula II is —N=, $a = 7-b$; c is a whole integer of from 2 to 10, inclusive; e is a whole integer of from 1 to 5, inclusive; g is a whole integer of from 2 to 4, inclusive, and p is a whole integer selected from the group consisting of 0 and 1; and wherein said polar compound is a compound that will substantially dissolve both the alkali metal sulfide and the polyhalo-substituted compound having a formula as defined.

13. A process according to claim 12 wherein said rate accelerator is zinc oxide.

14. A process according to claim 12 wherein said temperature is in the range of about 50° F. to about 275° F. above the melt point of said poly(arylene sulfide).

15. A process according to claim 12 wherein said cyclic compound is p-dichlorobenzene, said alkali metal sulfide is sodium sulfide, and said rate accelerator is a mixture of 2-mercaptobenzothiazole and benzothiazyldisulfide.

16. A process according to claim 13 wherein said cyclic compound is p-dichlorobenzene and said alkali metal sulfide is sodium sulfide.

* * * * *